United States Patent
Sánchez (10) Patent No.: US 11,125,194 B2
(45) Date of Patent: Sep. 21, 2021

(54) SILENCER FOR THE REDUCTION OF GAS NOISE IN AN INTAKE SYSTEM OF A COMBUSTION ENGINE AND A METHOD FOR THE PRODUCTION OF SUCH A SILENCER

(71) Applicant: MANN+HUMMEL GmbH, Ludwigsburg (DE)

(72) Inventor: Jorge Sánchez, Saragossa (ES)

(73) Assignee: MANN+HUMMEL GmbH, Ludwigsburg (DE)

(*) Notice: Subject to any disclaimer, the term of this patent is extended or adjusted under 35 U.S.C. 154(b) by 0 days.

(21) Appl. No.: 16/691,045

(22) Filed: Nov. 21, 2019

(65) Prior Publication Data
US 2020/0088144 A1 Mar. 19, 2020

Related U.S. Application Data

(63) Continuation of application No. PCT/EP2018/063022, filed on May 17, 2018.

(30) Foreign Application Priority Data

May 22, 2017 (EP) .................................. 17380014

(51) Int. Cl.
*F02M 35/12* (2006.01)
*F02M 35/10* (2006.01)

(52) U.S. Cl.
CPC .... *F02M 35/1216* (2013.01); *F02M 35/1036* (2013.01)

(58) Field of Classification Search
CPC ........... F02M 35/1216; F02M 35/1266; F02M 35/1036; B29C 65/06; B29C 66/12449; B29C 66/12463

USPC ..................................................... 123/184.53
See application file for complete search history.

(56) References Cited

U.S. PATENT DOCUMENTS

| | | | |
|---|---|---|---|
| 4,874,062 A | 10/1989 | Yanagida et al. | |
| 2014/0196977 A1* | 7/2014 | Hartmann | F01N 1/026 181/227 |

FOREIGN PATENT DOCUMENTS

| | | |
|---|---|---|
| CN | 201475535 U | 5/2010 |
| DE | 102007026826 A1 | 12/2008 |
| EP | 2067979 A1 | 6/2009 |
| EP | 2711534 A1 | 3/2014 |
| FR | 2945583 A1 | 11/2010 |
| JP | S5285048 A | 7/1977 |

(Continued)

*Primary Examiner* — Lindsay M Low
*Assistant Examiner* — Omar Morales
(74) *Attorney, Agent, or Firm* — James Hasselbeck (57) ABSTRACT

A silencer for reducing gas noise in a combustion engine intake system has a tubular casing with a first casing part and a second casing part connected to each other by a weld seam to form an outer casing wall, wherein the weld seam is a part of the outer casing wall. A third part for compensating gas noise is positioned inside the tubular casing. The third part is arranged in the tubular casing such that an annular cavity is formed by the third part and the outer casing wall. A weld flash protrudes from an inner surface of the outer casing wall into the annular cavity and is contained therein. The silencer is produced in a single welding process in which the first and second casing parts are connected to each other to form the outer casing wall and the third part is connected to the tubular casing.

21 Claims, 4 Drawing Sheets

(56) References Cited

FOREIGN PATENT DOCUMENTS

| | | |
|---|---|---|
| JP | 2009000855 A | 1/2009 |
| WO | 2016191780 A1 | 12/2016 |

* cited by examiner

SILENCER FOR THE REDUCTION OF GAS NOISE IN AN INTAKE SYSTEM OF A COMBUSTION ENGINE AND A METHOD FOR THE PRODUCTION OF SUCH A SILENCER

CROSS-REFERENCE TO RELATED APPLICATIONS

This application is a continuation application of international application No. PCT/EP2018/063022 having an international filing date of 17 May 2018 and designating the United States, the international application claiming a priority date of 22 May 2017 based on prior filed European patent application No. 17 380 014.5, the entire contents of the aforesaid international application and the aforesaid patent application being incorporated herein by reference.

BACKGROUND OF THE INVENTION

The present invention relates to a silencer for the reduction of gas noise in an intake system of a combustion engine and a method for the production of such a silencer.

Silencers comprising a casing which is welded by friction welding are disclosed by JP 2001280207 A2, EP 1 865 188 A1, EP 2 256 330 A1, EP 2 256 330 A1, and EP 2 711 534 A1. In most cases, the casing comprises a third part as an acoustic insert for the compensation of gas noise.

Typically, a friction welding process or other types of welding can create a big amount of welding flash on both sides of the welding seam or welding bead. This might create styling problems and harmful edges outside the silencer and a contamination problem inside the silencer, for example, in form of plastic chips, burrs and/or particles that might get sucked in by an engine of the vehicle causing damage. In addition, the necessary flash traps for the welding seam or beads require a large package space.

In order to prevent the detachment of particles that can cause clearance problems, so-called flash traps are provided at the inner surface of the silencer wall.

SUMMARY OF THE INVENTION

The problem to be solved is to provide a silencer that can be produced in a more efficient and clean way in comparison to the state of the art and that will cause less clearance issues and less need for package space for installation.

According to the invention, a silencer for the reduction of gas noise in an intake system of a combustion engine, preferably in a vehicle, a ship or machinery used in agriculture, mining and other industrial applications, comprises a tubular casing with a longitudinal casing axis and with at least a first and a second casing part welded together, wherein the two casing parts form an outer casing wall, wherein a weld seam connecting the first and the second casing parts is part of the outer casing wall and wherein a third part for the compensation of gas noise is positioned inside the tubular casing, wherein the third part is adopted and positioned in the casing in such a way that a weld flash which protrudes from an inner surface of the outer casing wall is kept inside an annular cavity formed at least by the third part and by the outer casing wall.

In one embodiment, the third part is adopted and positioned in the casing in such a way that a weld flash which protrudes from an inner surface of the outer casing wall is kept inside an annular cavity only formed by the third part and by the casing wall of the first and second parts. In this embodiment, there is no protruding of the outer casing wall towards the third part or a cavity or recess at the casing wall of the first and the second part on the inside. The shape of the flash trap is only provided by the third part and a mainly straight surface of the casing wall.

Preferably, the silencer can comprise two tight welded parts, preferably a first part and a second part forming the outer casing, and a third part being fixed to the welded parts. The fixation of the third part to the other two parts must not be air tight. It may have a leakage. The fixation of the third part to the other parts is to avoid rattling noise and provide an acoustic tightness.

Preferably, the third part can be fixed by the flash or melted material of the weld seam occurring during welding between the first part and the second part. The silencer can be produced by welding the first part and the second part together and fixing the third part at the same time at the weld seam.

Preferably, the silencer can be produced by the method of spin welding of a first part and a second part with fixation of the third part during this welding process, connecting three parts in one welding process.

The silencer can be produced in a very clean way, wherein particles of the welding area will not interfere with the gas flow stream through the silencer and the particles will not be transported by the gas stream to other parts of the engine or vehicle. Therefore, the silencer can be produced under very clean conditions and without the need of a double flash trap provided by the first and the second parts.

The cavity covering the weld seam can preferably be a closed cavity.

Further favorable embodiments of the present invention are subject matter of the dependent claims.

The third part could preferably be designed as an acoustic Maxwell-resonator for the compensation of gas noise. The silencer can also be additionally or alternatively used for the reduction of pulsation caused by the combustion engine.

The casing wall can extend parallel to the casing axis at a first radius over a section of the first casing part and a section of the second casing part, wherein the weld seam connecting the first and the second casing parts is positioned at the first radius.

The third part can be form fitted, preferably clamped, or welded between a first contact surface of the first casing part and a first contact surface of the second casing part. In this way, it is possible to connect the third part with the casing in one welding process.

The whole silencer can therefore either be a single piece or it can consist of two or more pieces, i.e., at least the casing as a first piece of the silencer and the third part as a separate second piece of the silencer.

The third part and the first casing part and the second casing part can form an inner wall as gas duct, preferably a gas duct with a uniform inner radius over at least a section of the first casing part, the second casing part, and the third part. The connection of the casing and the third part is located at the outer wall of the casing. No weld flash will interfere with the flow of the gas through the gas duct causing turbulence of the gas flow or generate further noise.

The third part in combination with the first casing part and/or the second casing part can form at least two, preferably at least three, circular cavities between the inner wall and the outer wall. This cavity can support the compensation of noise and can provide a broad band effect. The sizes of the cavities are important for tuning the acoustic behavior of the silencer. With a silencer with a structure according to this invention, the sizes of the cavities can be extended without increase of the outer dimensions of the silencer, or the dimensions of the silencer can be decreased without decrease of the sizes of the cavities compared to conventional silencers.

The inner wall can preferably be provided with openings, preferably with one or more openings in the third part and openings between the third part and the first casing part and/or the second casing part for improved gas noise compensation. These openings can preferably be formed as slots.

The third part can be in contact with the casing by a first and a second projection which extend radially from the section of the inner wall of the third part to the casing at two different axial positions. With reference to the gas flow passing the gas duct, the first position will be upstream to the second position. The contact could preferably be a form fit or a welding connection. The contact at two different positions along the casing axis will provide a higher stability for the position of the third part in the casing.

A third projection and a fourth projection of the third part that protrude radially from an annular end section of the second projection form together with the outer casing wall and with the end section the annular cavity at the inner surface of the outer casing wall for covering the weld flash which protrudes from the weld seam in the annular cavity.

The annular cavity can have an axial extension of less than 10% of the length of the silencer.

The outer wall of the casing can be provided with a rim that extends radially from the outer surface of the outer wall of the casing, wherein the rim is provided as a flash trap and preferably covers at least partially a second weld flash which protrudes from the weld seam. In this way, an outer flash trap is provided at the outer wall.

The weld seam can extend from a first weld point at the inner surface of the outer wall to a second weld point at the outer surface of the outer wall, wherein the first and the second weld points are not positioned on the same plane perpendicular to the casing axis. The weld seam could therefore progress diagonally through the wall so that lateral forces will affect the stability of the weld connection in a smaller amount.

In addition, the first and the second welding surfaces that are connected to the weld seam could preferably have a cone-shaped form so that, during the welding process and the formation of the outer wall, an alignment or a self-centering of the two casing parts will take place.

The alignment will also result in a more accurate form fit or weld connection of the third part with the housing.

The casing can advantageously consist of a polymer material, preferably a polyamide.

According to the invention, a method for the production of the inventive silencer comprises at least one welding process, wherein the outer casing wall is formed and the third part is connected to the casing in one welding process during the formation of the outer casing wall. In this way, the production can be done very effectively.

The welding process can preferably be done by a hot gas welding process and/or a friction welding process, preferably a spin welding process.

It is of advantage when the first part of the casing has a first conical welding surface and the second part of the casing has a second conical welding surface, wherein the first and the second welding surfaces are provided to form the weld seam during the welding process. In this way, an alignment of the two casing parts can be provided which is of advantage for an accurate position of the form fit or welding connection of the third part at the inner surface of the outer casing wall.

BRIEF DESCRIPTION OF THE DRAWINGS

An advantageous embodiment of the invention is further explained in detail by a drawing. Specific parts of the embodiment can be understood as separate features that can also be realized in other embodiments of the invention. The combination of features described by the embodiment shall not be understood as a limitation for the invention.

DESCRIPTION OF PREFERRED EMBODIMENTS

A silencer 1 according to the invention is shown in FIGS. 1-4. The silencer 1 can preferably be used for the reduction of gas noise in an air-intake system 401 of an internal combustion engine 403 and/or for the reduction of pulsation from the engine 403. Such an engine 403 can preferably be used in a vehicle, a ship, in agriculture or mining machinery or other fields of application. The gas 405 can preferably be air or combustion gas. The silencer 1 can work as a broad band silencer and can be used in a Helmholtz system.

The gas can preferably be a pressurized gas flow for or from the engine. In a further embodiment of the invention, the silencer 1 can also be used in a low pressure duct.

Figure 1:
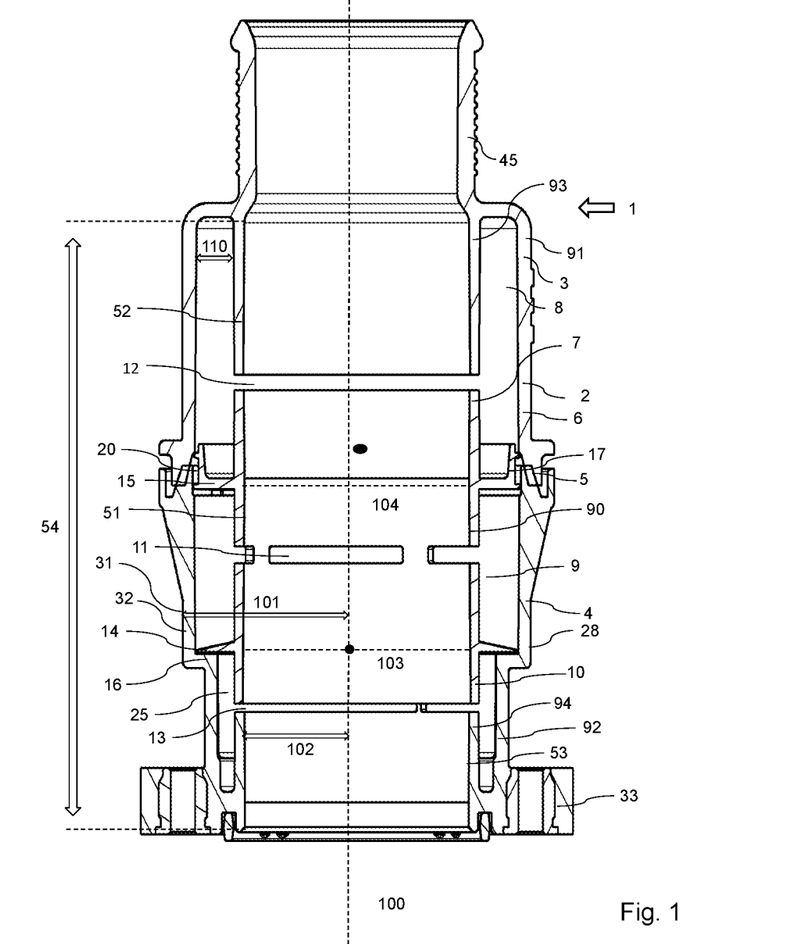
FIG. 1 shows a schematic sectional view of a silencer.

The silencer 1 of FIG. 1 comprises a tubular casing 2 having a longitudinal casing axis 100. The tubular casing is joined to one part with two casing parts 3 and 4 being connected by a welding process, therefore a weld seam 5 between the two casing parts 3 and 4 exists.

The casing 2 comprises an outer casing wall 6 and an inner wall 7 having both a mainly tubular form. The outer casing wall 6 and the inner wall 7 extend preferably over a section of at least 30% of the length of the silencer 1 concentrically to the outer casing wall 6. The casing parts 3 and 4 form the outer casing wall 6. The inner wall 7 is formed by the casing parts 3 and 4 and by a third part 10.

Therefore, each of the casing parts 3 and 4 comprise an outer casing wall section 91 and 92 and an inner wall section 93 and 94.

The radial distance 110 between the outer casing wall 6 and the inner casing wall 7 has an important impact on the acoustic behavior of the silencer. For at least 30% of the length of the silencer 1, especially of the casing 2, the radial distance 110 could be at least 5% of the radius 101 from an outer surface 31 of the outer casing wall 6 to the casing axis 100.

The weld seam 5 has a first end point 41 at an outer wall inner surface 30 of the casing part 3 or 4 and a second end point 42 at an outer wall outer surface 31 of the casing part 3 or 4. The first end point 41 and the second end point 42 are not positioned on the same plane, which plane is perpendicular to the casing axis 100.

The first part 3 of the two casing parts 3 and 4 comprises a connection section 45 positioned at the end of the first part 3 for attachment of a hose or pipe.

The second part 4 of the two casing parts 3 and 4 comprises a flange section 33 positioned at the end of the second part 4 for a connection with a gas pipe.

The silencer 1 comprises a third part 10 which can be integrally connected, in other words material bonded, to the casing housing 2 or which can be a separate element which is positioned form fitted inside the casing housing 2.

Third part 10 comprises a section 90 of the inner wall 7 with an inner surface 51 which has the same radial distance from the casing axis 100 as an inner surface 52 and/or 53 of the first part 3 or the second part 4 of the tubular casing 2.

The inner wall inner surface 52 of the first part 3, the inner wall inner surface 51 of the third part 10, and the inner wall inner surface 53 of the second part 4 form a uniform inner surface 54 which extends with the same radial distance 102 from the casing axis 100 over at least 50%, preferably 70%, of the inner wall 7 formed by all three parts 3, 10, and 4. The inner tubular surface 54 forms a duct for guiding the gas during its passage through the silencer 1

The inner tubular surface 54 is a gas duct for guiding a gas flow through the silencer 1. It is not a closed surface but is provided with openings 11, 12, 13 generating a broad band noise compensation effect. The openings 11, 12, 13 are shown in FIG. 1 as slots for a better noise compensation. The openings 11 are positioned in the section 90 of the inner wall 7 which is formed by the third part 10. Other openings can be positioned either in the sections 91 and/or 92 of the first and/or second part 3, 4 of the casing 2 or at the transition section between the third part 10 and either the first and/or the second part 3 or 4.

The openings 11, 12, 13 can be preferably designed as slots.

The inner casing wall 7 and the outer casing wall 6 together with the third part 3 form a first circular cavity 8, a second circular cavity 9, and a third circular cavity 25, wherein the first, second and/or third circular cavity 8, 9 and/or 25 can be positioned concentrically to the inner wall 7. The circular cavities 8, 9 and 25 can have different volumes and gas can enter the cavities 8, 9 and 25 through the openings 11, 12 and 13. The volumes of the cavities are important to tune the silencer.

The circular cavities 8, 9, and 25 are limited circumferentially by the outer casing wall 6 formed by the two casing parts 3 and 4 and are aligned along the casing axis 100 in flow direction one after the other. Preferably, each of the cavities 8, 9 and 25 has at least one opening 11, 12 and/or 13.

The annular cavities 8, 9, and 25 are limited circumferentially by the outer casing wall 6 formed by the two casing parts 3 and 4 and are aligned along the casing axis 100 in flow direction one after the other. Preferably, each of the cavities 8, 9 and 25 has at least one opening 11, 12 and/or 13.

The third part 10 comprises the annular wall section 90 as a part of the inner wall 7. The openings 11 are positioned in the annular wall section 90. A first projection 14 of the third part 10 extends radially from the annular wall section 90 and interacts with a first contact surface 16 of the outer casing wall 6.

In FIG. 1, the first projection 14 is formed as a ring at a first axial position 103 of the casing axis, which is of advantage for a reinforced holding of the third part 10 in the casing 2. It is however also possible that the first projection 14 is formed by a plurality of pins or bolts which have end parts that are all positioned on the same plane perpendicular to the casing axis 100 and which are circumferentially distributed around the annular wall section 90.

There are numerous other possibilities to realize the first projection.

Figure 2:
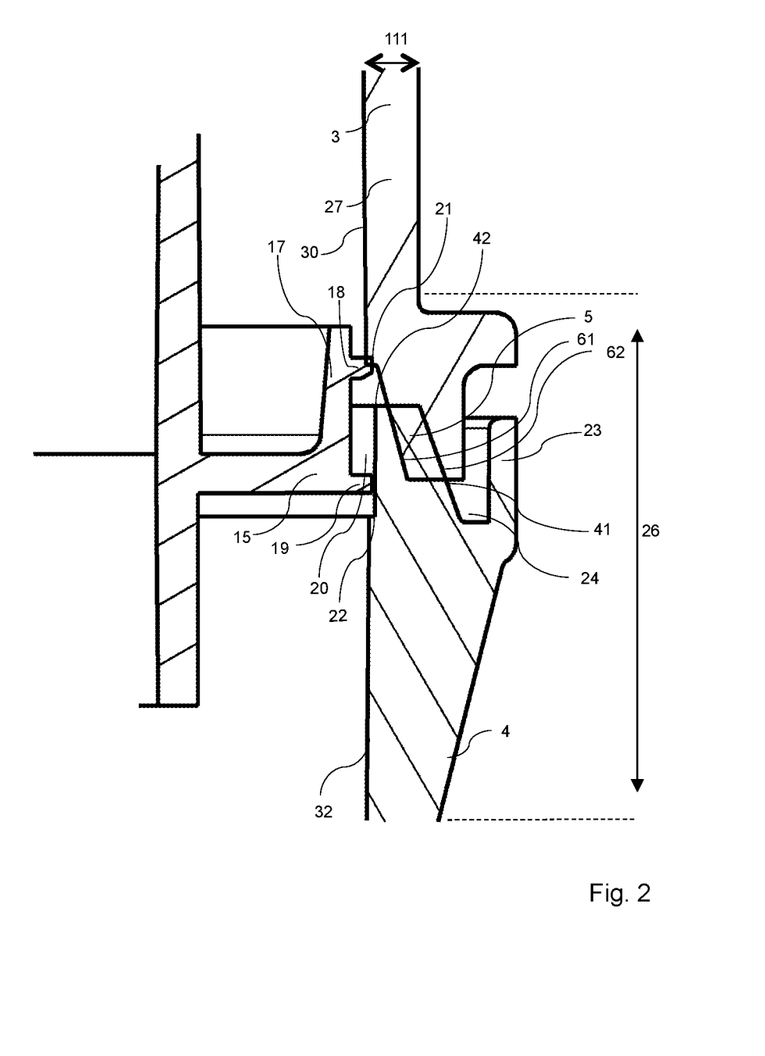
FIG. 2 shows a detailed view of a connection of three parts of the silencer of FIG. 1.

The connection between the first casing part 3, the second casing part 4, and the third part 10 is explained in more detail with regard to FIG. 2.

A second projection 15 extends radially from the annular wall section 90 of the third part 10 at a second axial position 104 of the casing axis 100. The second projection 15 has an end section 17 with an annular form that extends concentrically to the wall section 90. The end section 17 comprises a third and a fourth projection 18 and 19, which extend radially from the end section 17 and which interact with a second and a third contact surface 21 and 22 of the outer casing wall 6. The third and the fourth projections 18 and 19 opposing the contact surfaces 21 and 22 of the outer casing wall 6 are mainly located on the same cylindrical surface. There is no recess in the outer wall 6 between the contact surfaces 21 and 22 to form a cavity used as a flash trap.

The interaction of the third projection 18 with the second contact surface 21 or of the fourth projection 19 with the third contact surface 22 can be a weld connection or a form fit without a material connection between the third part 10 and the casing 2.

As shown in FIG. 2, the two projections 18, 19 form an annular cavity 20 between the second projection 15, especially the end section 17, of the wall section 90 and the inner surface 30 of the outer casing wall 6 so that material of the weld seam 5 that will be formed during the welding process for the connection of the first and second parts 3 and 4 of the casing 2 will project over the inner surface 30 of the outer casing wall 6 and will be guided into the cavity 20. The radial extend of the cavity 20 is only determined by the extend of the third and the fourth projections 18 and 19. The radial distance 110 between the outer casing wall 6 and the inner casing wall 7 can be constant in the area before and behind the connection area 26.

A formed weld flash which could probably project from the inner surface 30 and which would disturb the flow of the gas and would cause impurity problems is covered in the present invention by the third part 10 without the need for a further flash trap channel being formed at the inner surface of the outer wall 6.

A rim 23 projects radially from the outer surface 31 of the outer casing wall 6. The rim 23 is provided with a groove 24 that extends in a parallel direction to the casing axis 100 in the rim 23.

The groove 24 is a collection space for material which is formed due to material displacement from material compression during the welding process. The groove 24 is also provided as a cover of a welding flash. Such a groove 24 is often called flash trap.

The weld seam 5 and the rim 23 define a connection area 26. Next to the connection area 26, there could be a first and a second section 27, 28 of uniform wall thickness 111. The combined length of both sections 27, 28 of uniform wall thickness is preferably at least 20% of the whole length of the silencer 1 along the casing axis 100.

The uniform wall thickness 111 could preferably be 1.0 mm to 2.5 mm.

The material of the first and second casing parts 3 and 4 and/or of the third part 10 could preferably be a polymer material, most preferably a polyamide, especially a PA6-polymer.

Figure 3:
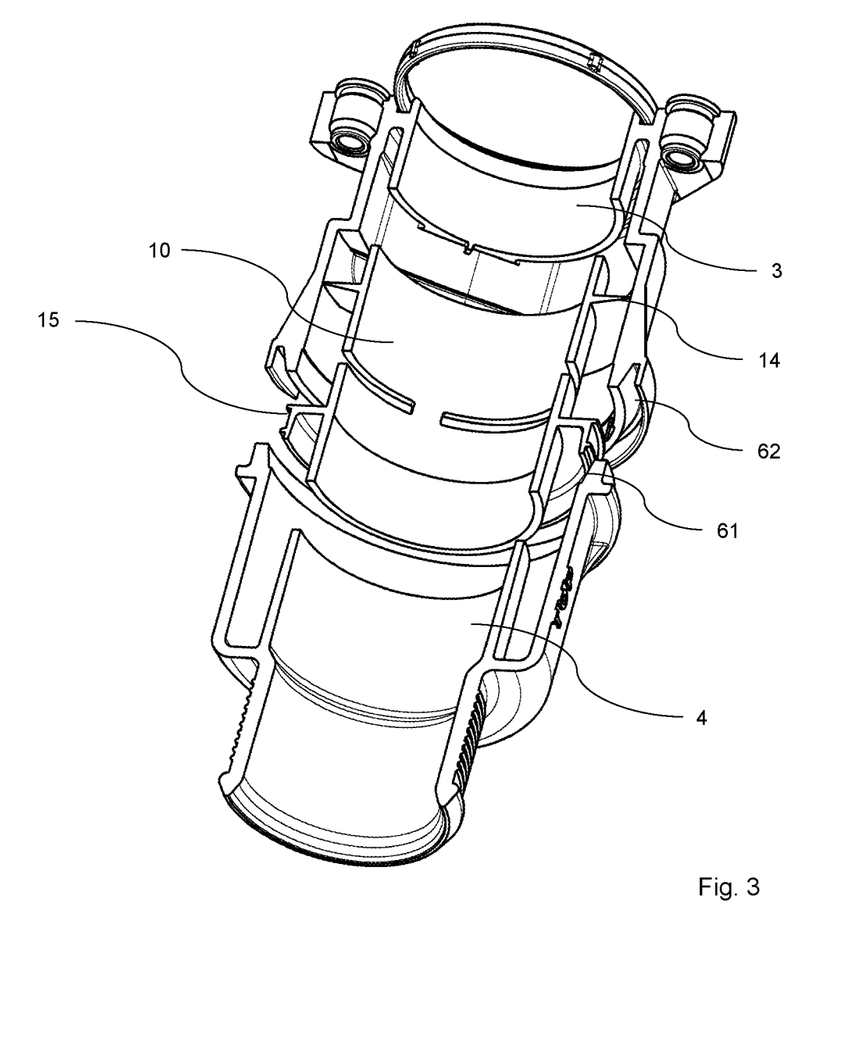
FIG. 3 shows a schematic perspective view of the parts of the silencer of FIG. 1 and FIG. 2 before they are connected in a welding process.
Figure 4:
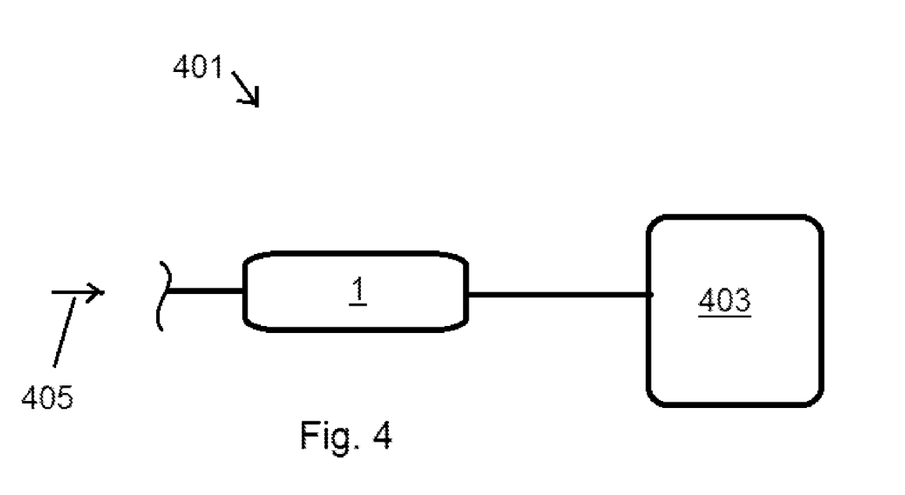
FIG. 4 is a schematic drawing of the silencer of FIGS. 1-3 in an air-intake system of an internal combustion engine.

According to a preferred example of a method for production of the present invention, the first and the second casing parts 3 and 4 are welded together by a friction welding process, preferably a spin welding process, or hot gas welding process.

Both casing parts 3 and 4 which will be welded together comprise a material thickening that will be partly displaced during welding due to partial melting under the influence of heat.

The third part 10 is placed between the two casing parts 3, 4 but only with the third and the fourth projections 18 and 19 so that a uniform wall is formed and the outer wall 6 of the casing 2 extends from the first to the second casing part 3 and 4 over a uniform circumference, especially without the interference of the third part 10 and preferably without a recess on the inner surface of the outer wall 6. This uniform circumference can be a defined radius, for example, from the middle of the outer wall 6 to the casing axis and this radius can be defined by the wall sections before and behind the connection area 26.

Due to pressure in axial direction during the welding procedure, the two casing parts 3 and 4 will merge into one another and the distance between the connection surfaces 21 and 22 will get smaller so that the third part 10 will be either form fitted with the projections 18, 19 between the second and third surface 21, 22 or the projections 18, 19 will be welded to the second and third surface 21, 22. In both cases, the cavity 20 between the third part 10 and the casing 2 will be formed for the accommodation of a weld flash or for material detached from the outer casing wall 6 during the weld process.

Prior to the formation of the weld seam 5, a welding surface 61 of the first casing part 3 and a welding surface 62 of the second casing part 4 forming the weld seam 5 will be conically or in other words cone-shaped so that the two casing parts will align during the formation of the wall. By this alignment or self-centering, the form fit or welding between the projections 18, 19 and the second and third surfaces 21, 22 will be more accurate. The welding profile including the welding seam 5 and welding flashes is in general wider than the welding seam 5. Clearance problems that can occur during and after the welding process can however be reduced with the current invention. The welding profile can also be realized with a thinner width. Therefore, the present invention provides advantages in terms of clearance and space for bigger acoustic volumes and an improved performance for the gas-noise, especially air-noise, compensation.

The production of the silencer 1 can be performed in a very clean way. Production tolerances can be compensated and the production can be done in a very time-efficient and cost-efficient way.

What is claimed is:

1. A silencer for reducing gas noise in an intake system of a combustion engine, the silencer comprising:
    a tubular casing comprising:
        a first casing part and
        a second casing part connected to each other by a weld seam to form an outer casing wall,
            wherein the weld seam connecting the first casing part and the second casing part is a part of the outer casing wall,
            wherein the tubular casing comprises a longitudinal casing axis;
        a third part, configured to compensate gas noise, positioned inside the tubular casing,
            wherein the third part is configured and positioned in the tubular casing such that an annular cavity is formed at least by the third part and the outer casing wall and positioned radially between the at least by the third part and the outer casing wall
            wherein the third part comprises:
                a first projection and
                a second projection arranged at two different axial positions of an annular wall section of the third part,
                    wherein the first projection and the second projection extend radially away from the annular wall section of the third part toward the tubular casing and contact the tubular casing;
                    wherein the second projection comprises an annular end section comprising
                        a third projection and
                        a fourth projection,
                            wherein the third and forth projections protrude radially outwardly from the annular end section,
                            wherein the annular end section with the third and fourth projections form together with the outer casing wall the annular cavity at an inner surface of the outer casing wall.

2. The silencer according to claim 1, wherein the outer casing wall extends at a first radius parallel to the longitudinal casing axis over a section of the first casing part and over a section of the second casing part, wherein the weld seam is positioned at the first radius.

3. The silencer according to claim 1, wherein the third part is form fitted between a first contact surface of the first casing part and a first contact surface of the second casing part.

4. The silencer according to claim 1, wherein the third part is clamped between a first contact surface of the first casing part and a first contact surface of the second casing part.

5. The silencer according to claim 1, wherein the third part is welded to a first contact surface of the first casing part and to a first contact surface of the second casing part.

6. The silencer according to claim 1, wherein the third part, the first casing part, and the second casing part together form an inner wall as a gas duct for guiding a gas flow through the silencer.

7. The silencer according to claim 6, wherein the gas duct has a uniform inner radius over at least a section of the first casing part, the second casing part, and the third part.

8. The silencer according to claim 6, wherein the gas duct has a section with a uniform inner radius, wherein a length of the section with a uniform radius extends over at least 50% of a length of the silencer.

9. The silencer according to claim 8, wherein the length of the section with a uniform inner radius extends over at least 70% of the length of the silencer.

10. The silencer according to claim 6, wherein the third part forms, together with one or both of the first casing part and the second casing part, at least two circular cavities between the inner wall and the outer casing wall.

11. The silencer according to claim 6, wherein the third part forms, together with the first casing part and the second casing part, at least three circular cavities between the inner wall and the outer casing wall.

12. The silencer according to claim 6, wherein the inner wall is provided with openings configured to improve gas noise compensation.

13. The silencer according to claim 12, wherein the openings include one or more first openings provided in the third part and
further include second openings provided between the third part and one or both of the first casing part and the second casing part.

14. The silencer according to claim 1, wherein
the annular cavity has an axial extension of less than 10% of a length of the silencer.

15. The silencer according to claim 1, wherein
the outer casing wall of the tubular casing comprises
a rim extending radially outwardly from an outer surface of the outer casing wall of the tubular casing.

16. The silencer according to claim 1, wherein the tubular casing consist of a polymer material.

17. The silencer according to claim 16, wherein the polymer material is polyamide.

18. A method for producing the silencer according to claim 1, the method comprising,
in a single welding process, connecting the first casing part and the second casing part to each other to form the outer casing wall and connecting the third part to the tubular casing.

19. The method according to claim 18, further comprising
selecting the welding process from a hot gas welding process; a friction welding process; and a combination of a hot gas welding process and a friction welding process.

20. The method according to claim 19, wherein
the friction welding process is a spin welding process.

21. The method according to claim 18, further comprising
providing the first casing part with a first conical welding surface and the second casing part with a second conical welding surface and
forming the weld seam at the first and the second conical welding surfaces.

* * * * *